Dec. 18, 1928.
J. R. OISHEI
1,695,342
WINDSHIELD WIPER
Filed March 8, 1924
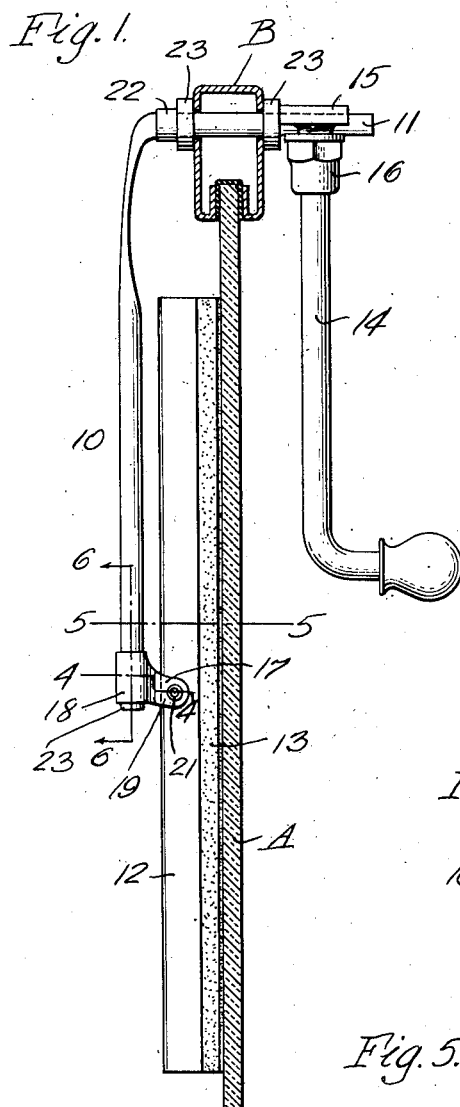
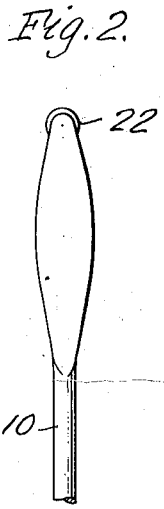
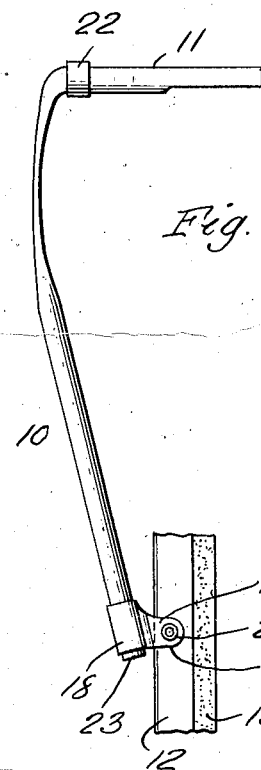
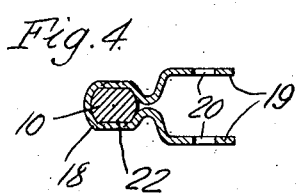
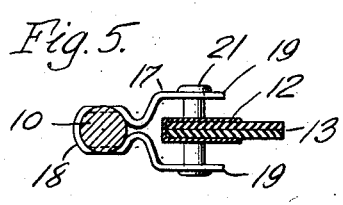
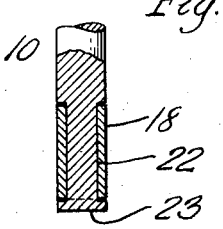
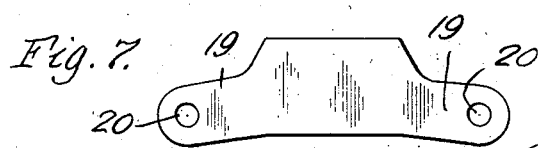
INVENTOR.
John R. Oishei
by Parker & Brockwar.
ATTORNEYS.

Patented Dec. 18, 1928.                                                           1,695,342

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

WINDSHIELD WIPER.

Application filed March 8, 1924. Serial No. 697,883.

This invention relates to windshield wipers of the type adapted to be mounted on the windshield of an automobile to clean the surface of the windshield glass.

Heretofore, windshield wipers have been provided having wiper-carrying arms, that is, pendent arms or the like on which the rubber strips or other wipers are mounted, consisting of two or more major parts connected together and having separate springs or the like for urging the lower part of the wiper-carrying arm and its attached rubber or wiper into contact with the face of the windshield glass. These separate springs are, as a rule, difficult to attach and constitute a considerable item of expense in devices of this sort. In addition to the item of expense and trouble in assembling, the separate springs are liable to get out of place, whereupon they do not properly perform their function. At the same time, there have been provided, windshield wipers having wiper-carrying arms, portions of which are reduced or cut away, the major part of the arm being relatively rigid, such for example as illustrated in Patent No. 1,658,389 granted to me February 7, 1928. In these devices the wiper carrying arm has, as a rule, been formed of two or more portions of material, which must necessarily be connected together in the manufacture or assembling of the device.

In other types of these devices the wiper carrying arm has been made in the form of a relatively flat spring strip or arm. These have proved ineffectual in use by reason of the fact that, when the wiper reaches the end of a stroke and is reversed, this spring strip will twist, thereby permitting the wiper strip to lift from or be twisted on the glass.

The objects of the present invention are to provide a windshield wiper of extremely simple construction, which may be readily manufactured at relatively small expense; also to provide a windshield cleaner which is adapted for ready manufacture in quantity production; also to provide a windshield cleaner having a unitary one-piece wiper carrying arm of improved construction; also to provide a windshield cleaner of sturdy and strong construction and long life and consisting of a minimum of parts; and also to provide improvements in wiper-carrying arms for windshield cleaners or wipers. Further objects are to provide improvements in windshield wipers in the other respects hereinafter set forth and claimed.

In the accompanying drawings:

Fig. 1 is a side elevation of a windshield cleaner embodying the present invention, a part of a windshield glass and frame being shown in section.

Fig. 2 is a portion of a front elevation of the wiper shown in Fig. 1.

Fig. 3 is a portion of a side elevation of the wiper shown in Fig. 1, removed from the windshield glass and without the handle or actuating portion.

Fig. 4 is a section on line 4—4, Fig. 1, with the rubber wiper strip removed.

Fig. 5 is a section on line 5—5, Fig. 1.

Fig. 6 is a section on line 6—6, Fig. 1.

Fig. 7 is a plan view of the blank for the pivot clip for the wiper-strip.

A designates a windshield glass and B designates a frame bar of the windshield. In the drawings the wiper is shown as mounted in the frame bar of the windshield. It is well understood, however, the wiper may be mounted in any suitable manner, as for example by means of a clamp positioned on a portion of the windshield frame bar, or mounted directly through the glass of the windshield, these being common methods of mounting these devices in the art, and not necessary to be illustrated here.

In the preferred form of invention illustrated, 10 designates the wiper-carrying arm. It is preferred that this wiper carrying arm 10 be made integral with the rock shaft or pivot for the wiper. Accordingly, in the form shown, a portion of the metal which forms the wiper-carrying arm is bent to extend at substantially a right angle to the wiper-carrying arm thereby forming the pivot or rock shaft 11. As illustrated, the wiper carrying arm is preferably constructed from a portion of a rod of suitable metal, which, owing to the diameter of the rod and the character of the metal is preferably substantially rigid.

12 designates the wiper-strip having a portion of suitable wiping material 13 therein to contact with the windshield glass and 14 designates a handle secured on one end of the pivot or rock shaft. This handle may be of any suitable form. In the form illustrated, the handle is provided with a strap portion 15 adapted to surround an end of the pivot or rock shaft and to cooperate with a locking nut 16 which is threaded onto the handle so that the handle may be securely clamped between the strap and the locking nut. The handle may be readily removed when desired to permit installation of the cleaner on a windshield or to permit it to be taken off of the shield.

In order to provide for pressing or urging the wiper strip resiliently into contact with the face of the windshield glass to be wiped, the wiper carrying arm is provided during the course of manufacture with an inherent, integral, resilient or spring portion. This is preferably accomplished by pressing or squeezing a portion of the wiper-carrying arm so as to reduce its diameter in a plane at right angles to the face plane of the windshield glass and at the same time retain the same weight or amount of metal in the resilient portion of the arm as is present in other portions of the arm. This operation may be readily accomplished by a stamping press and the resiliency or spring of the resilient portion of the wiper carrying arm may be readily regulated by the amount of pressure placed upon the arm in this operation. The retention of all of the metal in the arm at the reduced resilient point results in the arm having no weakened portion, and while it permits the arm to flex or move toward the windshield glass it prevents any flexing of the wiper-carrying arm in a plane parallel to the surface plane of the windshield glass. As illustrated in Figs. 1 and 2, in one vertical plane the resilient portion of the carrying arm tapers toward the center point of that resilient portion while in points in the vertical plane at right angles to the first plane the resilient portion tapers toward the end of said resilient portion. This results in a construction which precludes the possibility of the resilient portion twisting or turning on the axis of the wiper carrying arm, which twisting or turning would permit the wiper strip to get out of effective contact with the windshield glass.

The invention also includes means for mounting the wiper-strip on the wiper-carrying arm. In the preferred form of the invention shown, these means comprise a clip 17 having a body portion 18 which is adapted to engage a part of the wiper carrying arm and leg or end portions 19 which carry the pivot or mounting for the wiper-strip. As illustrated in the drawings, this clip may be formed of a simple blank of sheet metal such as illustrated in Fig. 7, the leg portions of which are provided with holes 20 for receiving a rivet 21 or other means for pivotally mounting the wiper strip. The rivet 21 extends through the metal channel 12 of the wiper strip. This clip is readily secured on the wiper carrying arm by providing a cutaway or flattened portion on the wiper carrying arm, shown at 22, this preferably being done so as to leave a stop portion 23 on the wiper carrying arm which serves to prevent the clip from sliding off of the arm. When the clip is placed on the arm the sides of the clip are pressed, or the clip and arm are squeezed so that the sides of the body portion of the clip conform to the flat surfaces on the wiper carrying arm and insure that the clip will not turn upon the arm.

The pivot or rock shaft 11 is preferably provided with an enlargement or collar 22. This enlargement or collar 22 may be integral and formed with the pivot or rock shaft portion of the wiper, or it may be a separate piece secured in fixed position on the pivot portion by any suitable means. This collar portion 22 provides a stop for one or more of the usual washers 23 which hold the moving parts of the device safe from the windshield frame or from the clamp by means of which the device is secured to the windshield.

I claim as my invention:

In a windshield wiper, a one-piece combined shaft and wiper carrying arm formed from a length of rod bent intermediate its ends to a substantially right angular form, said wiper carrying arm being flattened transversely immediately adjoining the shaft to define and provide an integral resilient portion, said resilient portion being bowed longitudinally to normally dispose the free end portion of the arm at an acute angle to the shaft, and a wiper element secured to the outer end of the arm, said resilient portion providing spring pressure yieldably urging said wiper element against the windshield glass when said shaft is mounted thereon, said shaft being provided with an enlargement immediately adjacent said resilient portion for abutting against its windshield mounting to thereby gage and definitely determine the resilient pressure to be exerted on said wiper element.

JOHN R. OISHEI.